US012802334B2

(12) United States Patent
Bourd et al.

(10) Patent No.: US 12,802,334 B2
(45) Date of Patent: Nov. 17, 2026

(54) HARDWARE ACCELERATION FOR STACK OPERATIONS IN RAY TRAVERSAL

(71) Applicant: QUALCOMM Incorporated, San Diego, CA (US)

(72) Inventors: Alexei Vladimirovich Bourd, San Diego, CA (US); Aleksandra Hannan, La Jolla, CA (US); Fei Wei, San Diego, CA (US); Rohan Srivastava, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/665,200

(22) Filed: May 15, 2024

(65) Prior Publication Data

US 2025/0356573 A1 Nov. 20, 2025

(51) Int. Cl.

| | |
|---|---|
| ***G06T 15/06*** | (2011.01) |
| ***G06T 15/00*** | (2011.01) |
| ***G06T 17/00*** | (2006.01) |
| ***G06T 17/10*** | (2006.01) |

(52) U.S. Cl.

CPC ............ *G06T 15/06* (2013.01); *G06T 15/005* (2013.01); *G06T 17/005* (2013.01); *G06T 17/10* (2013.01); *G06T 2210/12* (2013.01)

(58) Field of Classification Search

None

See application file for complete search history.

(56) References Cited

U.S. PATENT DOCUMENTS

| | | | | |
|---|---|---|---|---|
| 2016/0070820 A1* | 3/2016 | Laine | G06T 9/001 707/797 |
| 2017/0206231 A1* | 7/2017 | Binder | G06T 15/06 |
| 2017/0372448 A1* | 12/2017 | Wald | G06T 15/06 |
| 2022/0051476 A1* | 2/2022 | Woop | G06F 9/5016 |
| 2023/0252717 A1 | 8/2023 | Mcallister et al. | |
| 2023/0298127 A1* | 9/2023 | Barczak | G06T 1/60 345/531 |
| 2025/0014259 A1* | 1/2025 | Levy | G06T 1/20 |

OTHER PUBLICATIONS

International Search Report and Written Opinion—PCT/US2025/018958—ISA/EPO—Jun. 11, 2025.

Meister D., et al., "A Survey on Bounding Volume Hierarchies for Ray Tracing", Chapter 1: Monte Carlo Path Tracing, Computer Graphics Forum: Journal of the European Association for Computer Graphics, Wiley-blackwell, Oxford, vol. 40, No. 2, Jun. 4, 2021, XP071554288, May 1, 2021, XP055870842, pp. 683-712, The Whole Document.

Laine S., "Restart Trail for Stackless BVH Traversal", High Performance Graphics (2010), Nvidia Research, Jan. 2010, 5 Pages.

* cited by examiner

*Primary Examiner* — Sultana M Zalalee

(74) *Attorney, Agent, or Firm* — Loza & Loza LLP

(57) ABSTRACT

Aspects of the disclosure are directed to ray tracing. In accordance with one aspect, the disclosure includes determining if a node state is a leaf node, wherein the node state is at a current node of a bounding volume hierarchy (BVH); determining a ray intersection of a first child node In one example, from the current node using the ray hit information and a traversal stack. In one example, the method further includes updating a state information about a second child node and subsequent child nodes using the traversal stack.

28 Claims, 8 Drawing Sheets

HARDWARE ACCELERATION FOR STACK OPERATIONS IN RAY TRAVERSAL

TECHNICAL FIELD

This disclosure relates generally to the field of information processing, and, in particular, to three-dimensional (3D) computer graphics processing with ray tracing.

BACKGROUND

Three-dimensional (3D) computer graphics may be used for 3D scene synthesis from a plurality of two-dimensional (2D) images. One graphics processing technique generates images through ray tracing. Ray tracing tracks light paths through a 3D scene by simulating object interactions and determining ray intersections. Geometric shapes (e.g., triangles, polygons, etc.) may be used to model 3D objects. An acceleration data structure may improve ray tracing operations. One example of an acceleration data structure is a bounding volume hierarchy (BVH) which groups scene geometric shapes in a hierarchical tree of bounding volumes which surround the scene geometric shapes. Ray tracing may traverse these hierarchies to determine intersections of rays with the scene geometric shapes.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides three-dimensional (3D) computer graphics processing with ray tracing. Accordingly, an apparatus includes: a tree traversal unit (TTU) configured to determine a next node from a current node; and a ray tracing unit (RTU) coupled to the TTU, the RTU configured to determine a ray intersection of a first child node of the current node.

In one example, the current node is of a bounding volume hierarchy (BVH). In one example, the RTU is further configured to generate a ray hit information. In one example, the apparatus further includes a shader processor coupled to the TTU, the shader processor configured to determine if a node state is a leaf node. In one example, the node state is at the current node of the BVH. In one example, the TTU is further configured to use a push operation on a traversal stack to create a first entry. In one example, the first entry is a plurality of intersected child nodes except a first child node. In one example, the TTU is further configured to use a pop operation on the traversal stack to create a second entry. In one example, the second entry is a plurality of intersected child nodes except a first child node.

Another aspect of the disclosure provides a method includes: determining if a node state is a leaf node, wherein the node state is at a current node of a bounding volume hierarchy (BVH); determining a ray intersection of a first child node In one example, from the current node using the ray hit information and a traversal stack. In one example, the method further includes updating a state information about a second child node and subsequent child nodes using the traversal stack.

In one example, the traversal stack includes a restart trail. In one example, the restart trail preserves state knowledge of which of the first child node, the second child node or the subsequent child nodes have been visited by a ray.

In one example, the method further includes updating the node state to the next node. In one example, the method further includes repeating the steps of claim 1 with a non-leaf node. In one example, the method further includes commencing a tree traversal for the BVH with the node state at a root node.

In one example, the ray intersection is a ray-axis aligned bounding box (AABB) intersection. In one example, the ray hit information is a list of geometric shapes intersected by a ray. In one example, the method further includes identifying the list of geometric shapes by ordering a plurality of child nodes of a current mode in a visitation sequence. In one example, the method further includes determining the next node based on an identification of geometric shapes from the ray hit information intersected by the ray. In one example, the method further includes determining the next node based on a tree structure of the BVH. In one example, the method further includes creating a first entry to describe all of the plurality of child nodes that are intersected by the ray. In one example, the method further includes creating the first entry using a push operation on the traversal stack. In one example, the method further includes creating a second entry using a pop operation on the traversal stack. In one example, the subsequent nodes are intersected by the ray.

Another aspect of the disclosure provides an apparatus for ray tracing, the apparatus including: means for determining if a node state is a leaf node, wherein the node state is at a current node of a bounding volume hierarchy (BVH); means for determining a ray intersection of a first child node of the current node to generate a ray hit information; and means for determining a next node of the BVH from the current node using the ray hit information and a traversal stack.

In one example, the apparatus further includes means for updating a state information about a second child node and subsequent child nodes using the traversal stack. In one example, the traversal stack includes a restart trail which preserves state knowledge of which of a plurality of child nodes have been visited by a ray.

Another aspect of the disclosure provides a non-transitory computer-readable medium storing computer executable code, operable on a device including at least one processor and at least one memory coupled to the at least one processor, wherein the at least one processor is configured to implement ray tracing, the computer executable code including: instructions for causing a computer to determine if a node state is a leaf node, wherein the node state is at a current node of a bounding volume hierarchy (BVH); instructions for causing the computer to determine a ray intersection of a first child node of the current node to generate a ray hit information; instructions for causing the computer to determine a next node of the BVH from the current node using the ray hit information and a traversal stack; and instructions for causing the computer to update a state information about a second child node and subsequent child nodes using the traversal stack. In one example, the traversal stack includes a restart trail which preserves state knowledge of which of a plurality of child nodes have been visited by a ray.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An information processing system, for example, a computing system with multiple slices (e.g., processing engines) or a system on a chip (SoC), may be used to synthesize a 3D scene using a plurality of 2D images. Synthesis, or rendering, of a 3D scene may be performed using a plurality of 2D images as a basis for the 3D scene rendering. In one example, 3D scene rendering may be computationally demanding such that execution on a given computing platform may not be performed in real time. That is, the computational processing rate for 3D scene rendering may exceed the capabilities of the given computing platform to complete the execution in desired timeline (e.g., at a real time display rate).

Figure 1:
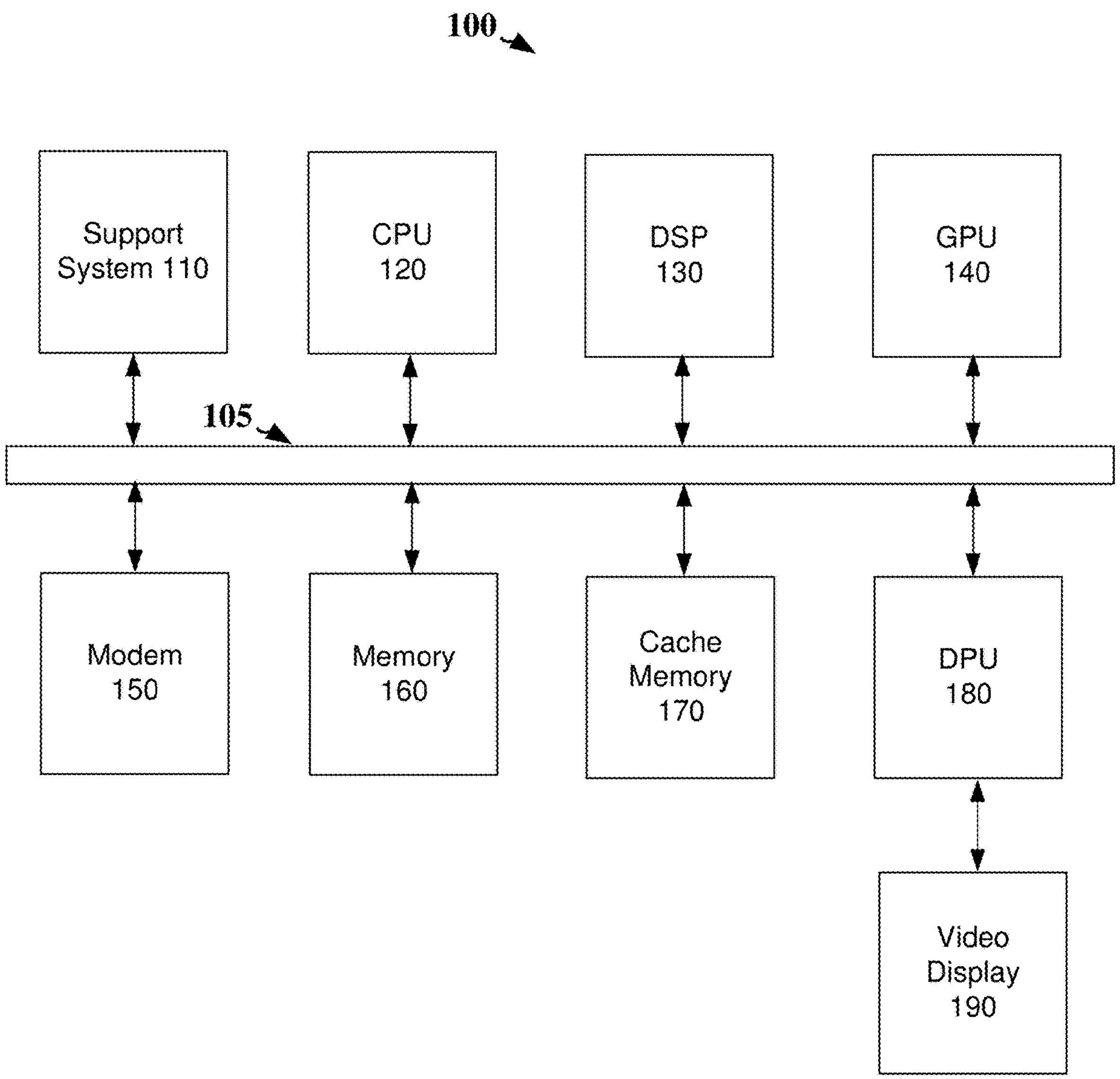
FIG. 1 illustrates an example information processing system.

FIG. 1 illustrates an example information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory which is not shared with the other processing engines.

In one example, the information processing system 100 may include a stack memory. In one example, the stack memory stores entries in a linear manner with a dynamic top of the stack memory (i.e., the top of the stack memory changes with each added entry). In one example, the stack memory is a memory structure with data access which operates with a last-in, first-out (LIFO) memory access paradigm. For example, LIFO memory access implies that data retrieval from the stack memory is executed using the most recently (i.e., last-in) stored data in the stack memory. In one example, the stack memory operates with two primitive stack operations, a push operation and a pop operation. For example, the push operation places a first entry onto the stack memory at the top of the stack memory. For example, the pop operation removes a second entry from the stack memory at the top of the stack memory. In one example, the stack memory uses a stack pointer to address the top of the stack memory. In one example, the stack pointer may be stored in a stack pointer register. For example, the stack pointer is incremented when a push operation is executed (i.e., an entry is added to the stack memory). For example, the stack pointer is decremented when a pop operation is executed (i.e., an entry is removed from the stack memory).

Figure 2:
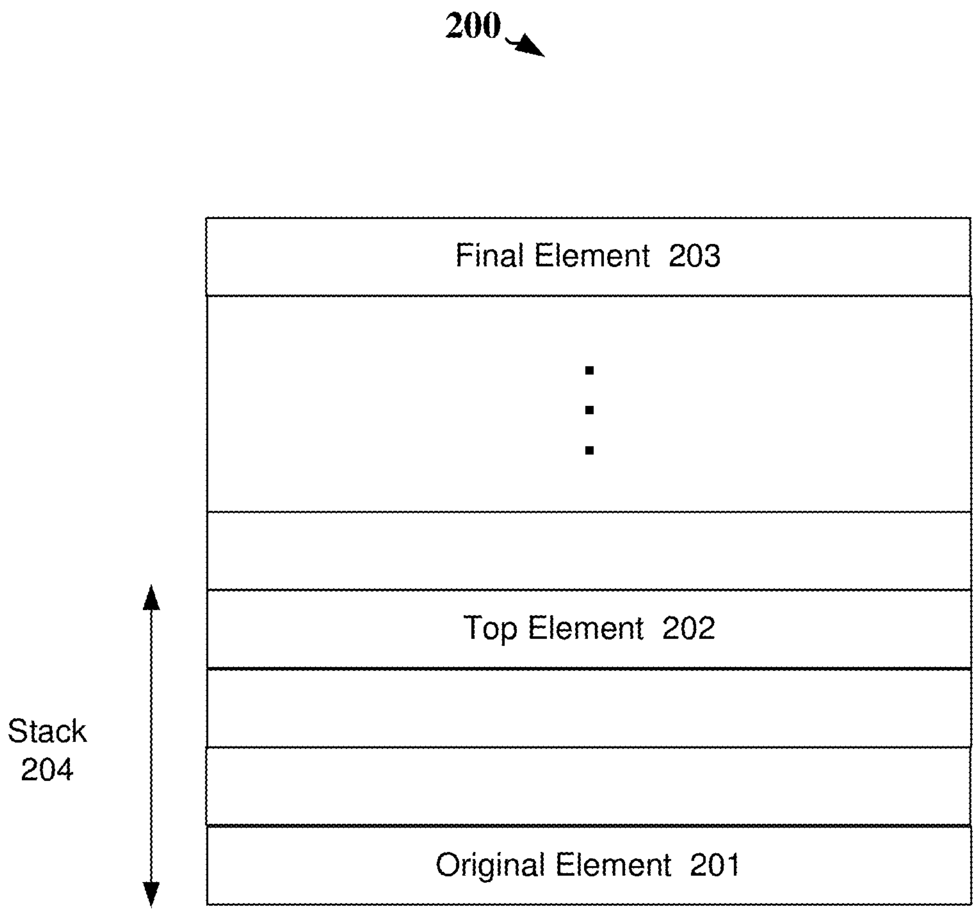
FIG. 2 illustrates a schematic view of an example stack memory.
Figure 3:
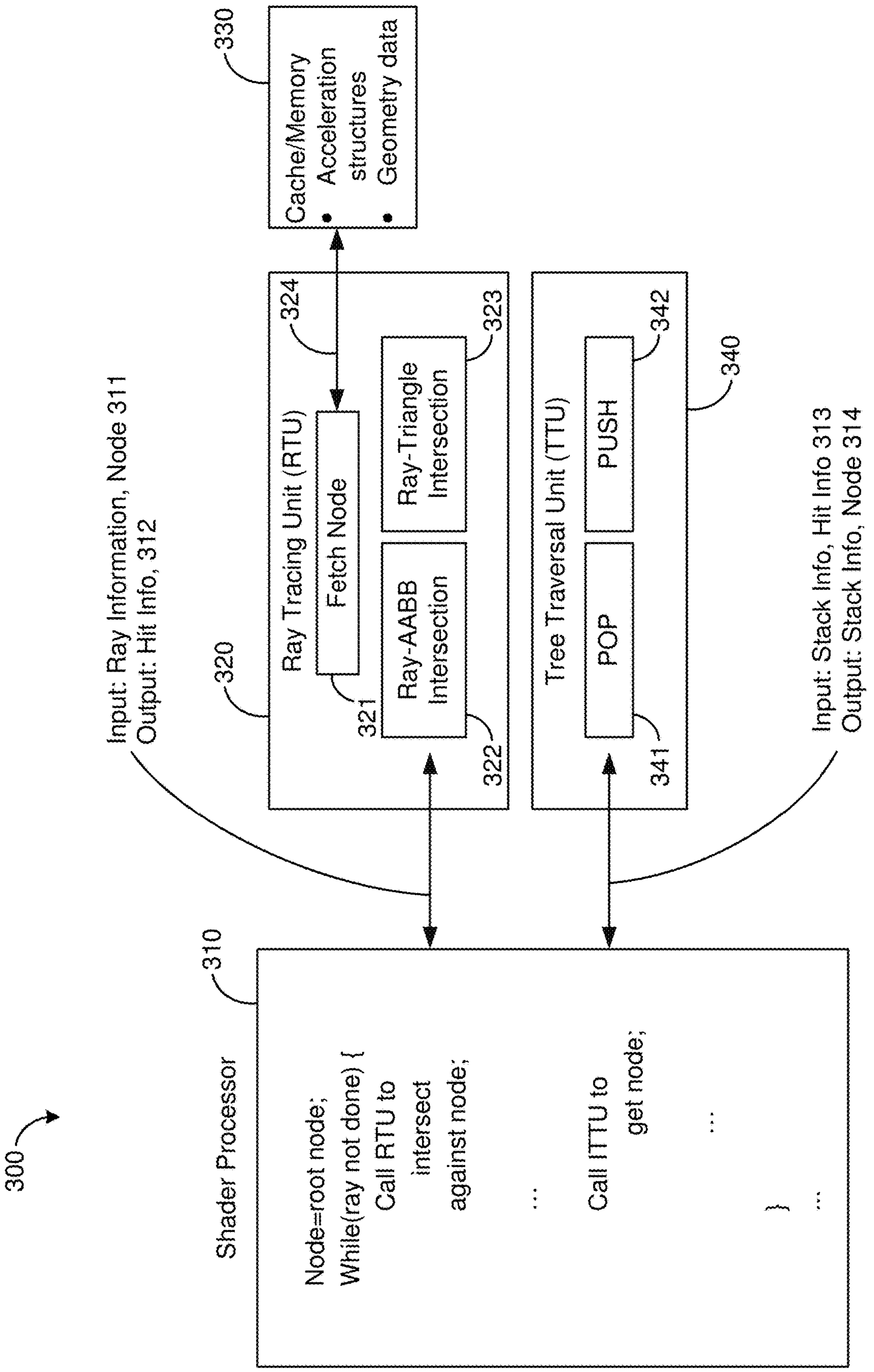
FIG. 3 illustrates an example ray tracing unit (RTU) and tree traversal unit (TTU) architecture.

FIG. 2 illustrates a schematic view of an example stack memory 200. In one example, the stack memory 200 includes a plurality of storage elements with an origin element 201, a top element 202 and a final element 203. In one example, a stack 204 is a plurality of storage elements of the stack memory 200 indexed between the origin element 201 and the top element 202.

In one example, ray tracing or ray traversal is a computationally demanding processing technique. In one example, ray tracing for one frame requires computational resources which scale with the quantity of rays traced per frame. In one example, real-time ray tracing may require hardware acceleration units or graphics processing units (GPUs) for parallel processing. In one example, real-time ray tracing may be implemented using tree-based acceleration structures for ray intersection determination. In one example, a scene may be represented by a plurality of bounding volume hierarchies (BVHs). In one example, a BVH is a tree structure with ever-tighter bounding volumes. In one example, the tree structure includes a plurality of BVH nodes arranged in a hierarchy with a root node at the top of the tree structure and a leaf node at the bottom of the tree structure. In one example, a non-leaf node is a node of the tree structure which is not at the bottom of the tree structure. In one example, the tree structure has branches which link a parent node to a child node, where the parent node is more proximate to the root node than the child node.

In one example, ray traversal incorporates visiting nodes of a bounding volume hierarchy (BVH) which may be organized in a tree structure with BVH nodes. For example, the tree structure may be a quad tree, that is a tree where each non-leaf node may have up to four child nodes. In one example, the tree structure may include a plurality of child nodes.

In one example, ray traversal visits nodes starting from a root node of the tree structure. In one example, for each visited node, a ray is intersected against axis aligned bounding boxes (AABBs) for child nodes and then a determination of which child nodes need to be visited. In one example, child nodes may be visited depth-first. That is, in an example, if more than one child node is intersected by the ray, descendants of a first child node are visited first, prior to visiting descendants of a second child node. In one example, the AABB has a rectangular parallelepiped shape with aligned orthogonal axes.

In one example, descendants of a plurality of child nodes may be stored by a traversal stack. In one example, the traversal stack stores a plurality of entries which may be placed or removed from the traversal stack. For example, the push operation places a first entry onto top of the traversal stack. For example, the pop operation removes a second entry from top of the traversal stack. In one example, the stack memory uses a stack pointer to address the top of the stack memory. In one example, the stack pointer may be stored in a stack pointer register.

In one example, an entry of the traversal stack contains information about second and subsequent child nodes which may be traversed by a ray but have not yet been visited. In one example, when the ray traverses more than one child node, an entry may be created which describes all traversed child nodes, except a first traversed child node. In one example, the entry may be pushed onto the traversal stack. In one example, the first traversed child node and its descendants may be visited. In one example, if subsequent child nodes are traversed, another entry may be created and pushed onto the traversal stack. For example, upon descent from the root node of the tree structure toward leaf nodes, either a leaf node is traversed or none of the subsequent child nodes are traversed. Subsequently, ray traversal continues by executing a traversal stack pop operation and visiting a first node described in a first entry of the traversal stack top.

In one example, the ray traversal continues by following other child nodes towards leaf nodes and adding additional entries to the traversal stack. In one example, ray traversal continues by repeating traversal stack pop execution until all nodes which are traversed by the ray are visited and all entries of the traversal stack have been processed.

In one example, maximum stack depth of the traversal stack is identical to BVH tree depth. For example, a scene in practical real-time scenarios may have greater than one million triangles with a tree depth of 30 to 100 entries. For example, if each entry occupies 64 bits, storage of the traversal stack in on-chip memory may be costly.

In one example, storage of a portion of the traversal stack in on-chip memory may be done either using stack caching or using a short stack with a restart trail. For example, a stack cache is part of on-chip memory and holds a few entries from top of the traversal stack. In one example, as the traversal stack grows, previously added entries are placed into on-chip memory. Conversely, as the traversal stack diminishes, new entries may be prefetched from on-chip memory. In one example, multiple entries may be placed or prefetched simultaneously which allows for improved memory request coalescing.

In one example, a short stack with restart trail is another technique to minimize on-chip memory utilization. In one example, the short stack supports a few (e.g., ten or less) entries. For example, when the short stack overflows (i.e., has no more capacity), a restart trail may be used to track visited nodes. In one example, the restart trail retains state knowledge of the short stack. For example, the restart trail requires a minimal quantity of bits per level of the BVH tree to preserve state knowledge of which nodes at a particular level have been visited. In one example, the short stack with restart trail may be accommodated in the on-chip memory. For example, usage of the short stack with restart trail avoids latencies related to accessing external memory (e.g., DDR memory). In one example, one design tradeoff is that some paths through the BVH tree may have to be visited a plurality of times.

In one example, the traversal stack has two primitive operations, a push operation and a pop operation. For example, the push operation places a first entry onto the traversal stack at the top and the pop operation removes a second entry from the traversal stack at the top. In one example, execution of the push operation or the pop operation involves handling various conditions such as determining if the traversal stack is empty or not. For example, handling conditional processing may result in a divergent control flow, multiple ALU operations, bit manipulation, memory loading and/or storage. In one example, using shader instructions to implement stack operations removes resources available to user-provided shaders. As a consequence, a hardware acceleration unit for traversal stack processing for push operations and pop operations may be utilized for improved efficiency. In one example, the hardware acceleration unit frees up a shader processor for other tasks.

In one example, a tree traversal unit (TTU) is a hardware acceleration unit for traversal stack processing. For example, the TTU and a ray tracing unit (RTU) have full task separation (i.e., operate individually without interference). In one example, the RTU is tasked with fetching BVH nodes from memory, performing data decompression on the BVH nodes and intersecting rays with AABBs or triangles. For example, the RTU is agnostic to a BVH tree structure (i.e., the RTU may operate without knowledge of the BVH tree structure being present).

In one example, the TTU is fully aware of the BVH tree structure but is ignorant of the node content. In one example, the TTU is agnostic to a ray (i.e., the TTU may operate without knowledge of the ray being present). In one example, both the RTU and the TTU are producers and consumers for both inputs and outputs. For example, the RTU may fetch a BVH node and produce a list of AABBs which are hit by the ray. For example, the list of hit AABBs is passed to the TTU, and the TTU determines which BVH node should be visited next. The next node determination information may be passed back to the RTU so that the next BVH node is fetched and intersected with the ray. In one example, this node processing is repeated for remaining BVH nodes of the BVH tree structure.

In one example, the TTU has no memory interface, is self-contained and has fixed latency in operation. In one example, the RTU has a memory interface and has variable latency in operation.

In one example, a first implementation of the TTU is a TTU for full stack. For example, the TTU for full stack uses a small amount of on-chip memory to store entries located at a top of the full stack. In one example, the full stack is spilled into memory or pre-fetched from memory. In one example, memory operations may be integrated into the TTU or may be implemented using existing load/store units.

In one example, a second implementation of the TTU is TTU for short stack with restart trail. For example, the TTU for short stack uses a small amount of on-chip memory to store the short stack and the restart trail. In one example, the TTU for short stack may not need memory access for a simpler design. For example, there may be a performance tradeoff for the TTU for short stack with repeated visitation of some of the BVH nodes.

In one example, stack operational performance using shader instructions may be inefficient due to excessive control flow and ALU operations which become a bottleneck. Also, implementing hardware acceleration for stack push and pop operations frees up resources to support more complex user-provided shaders. For example, utilization of the TTU may result in significant performance improvement for ray tracing use cases.

In one example, the TTU 340 includes a pop operator 341 and a push operator 342. For example, the pop operator 341 executes a pop operation on a traversal stack and the push operator 342 executes a push operation on the traversal stack. In one example, the RTU and TTU architecture 300 includes a shader processor 310, a ray tracing unit (RTU) 320, a cache memory 330 and a tree traversal unit (TTU) 340. In one example, the shader processor 310 includes shader software which performs ray traversal processing. In one example, the ray traversal processing commences with a root node of a traversal tree and for subsequent nodes calls the RTU 320 to determine ray intersections against subsequent nodes and calls the TTU 340 to determine which node to visit next. In one example, the ray traversal processing is terminated when a leaf node is reached. In one example, the root node, subsequent nodes and leaf nodes are BVH nodes.

In one example, the shader processor 310 sends a first input 311 to the RTU 320 with ray information and node information. In one example, the shader processor 310 receives a first output 312 from the RTU 320 with ray hit information. In one example, the shader processor 310 sends a second input 313 to the TTU 340 with stack information and ray hit information. In one example, the shader processor 310 receives a second output 314 from the TTU 340 with stack information and node information.

In one example, the RTU 320 includes a fetch node module 321, a ray AABB intersection module 322 and a ray-triangle intersection module 323. In one example, the fetch node 321 is interconnected to the cache memory 330 over a memory databus 324 to access acceleration structure data and geometry data which are stored in the cache memory 330. In one example, the ray AABB intersection module 322 determines ray intersections with AABBs and the ray-triangle intersection module 323 determines ray intersections with triangles.

Figure 4:
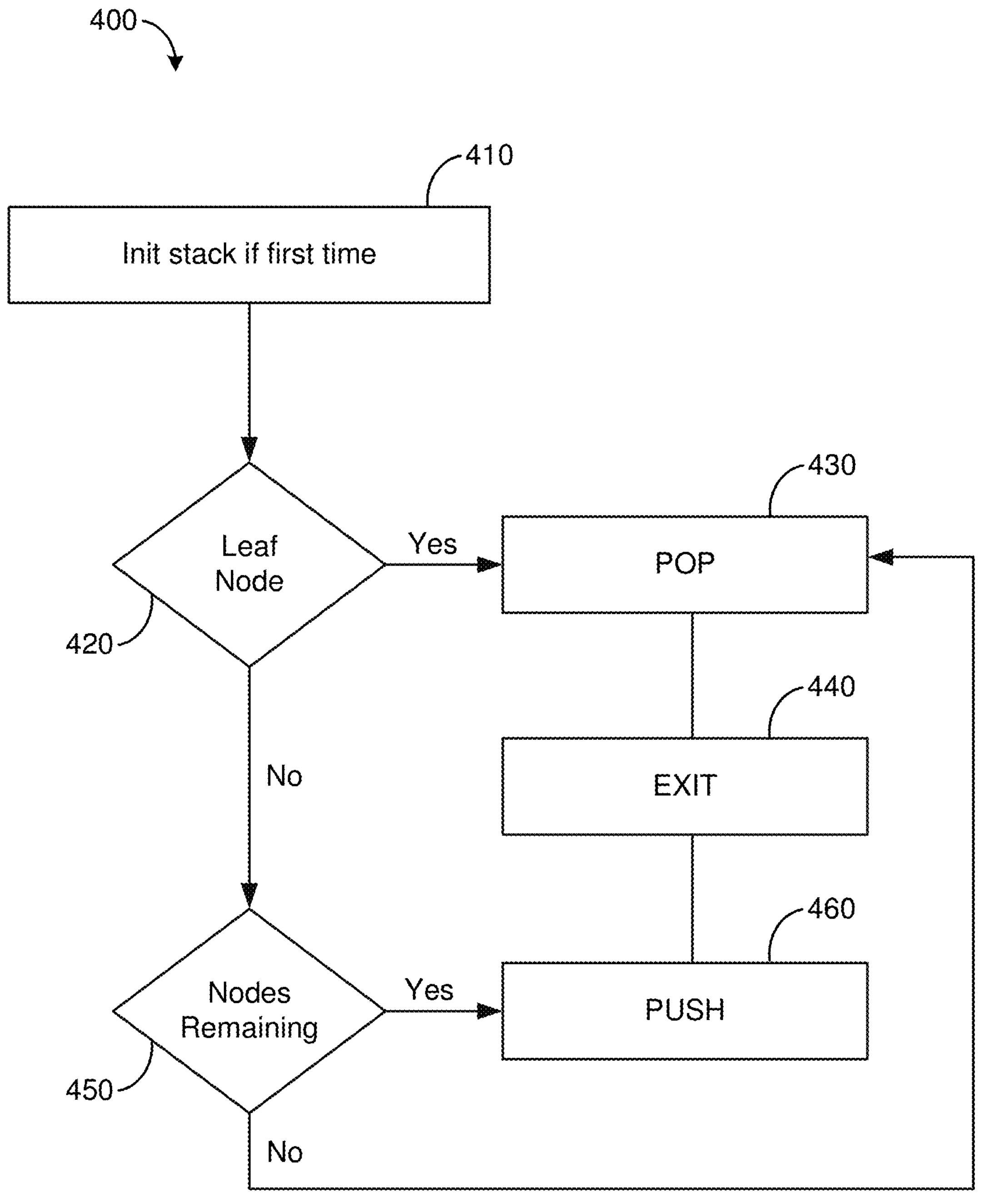
FIG. 4 illustrates an example tree traversal unit (TTU) operation flow diagram.

FIG. 4 illustrates an example tree traversal unit (TTU) operation flow diagram 400. In one example, the TTU operation flow diagram 400 represents a generic mechanism for TTU operations on both a short stack with restart trail and a full stack. In block 410, initialize a stack if at a first time. In one example, the first time is a time in which stack operations commence. In block 420, perform a leaf node comparison test. If a leaf node is present, then proceed to block 430. If a leaf node is not present, then proceed to block 450.

In block 430, execute a pop operation on the stack. Next, proceed to block 440 to exit the TTU operation flow diagram 400. In block 450, perform a nodes remaining test. If there are nodes remaining, then proceed to block 460. If there are no nodes remaining, then proceed to block 430. In block 460, execute a push operation on the stack. Next, proceed to block 440 to exit the TTU operation flow diagram 400.

Figure 5:
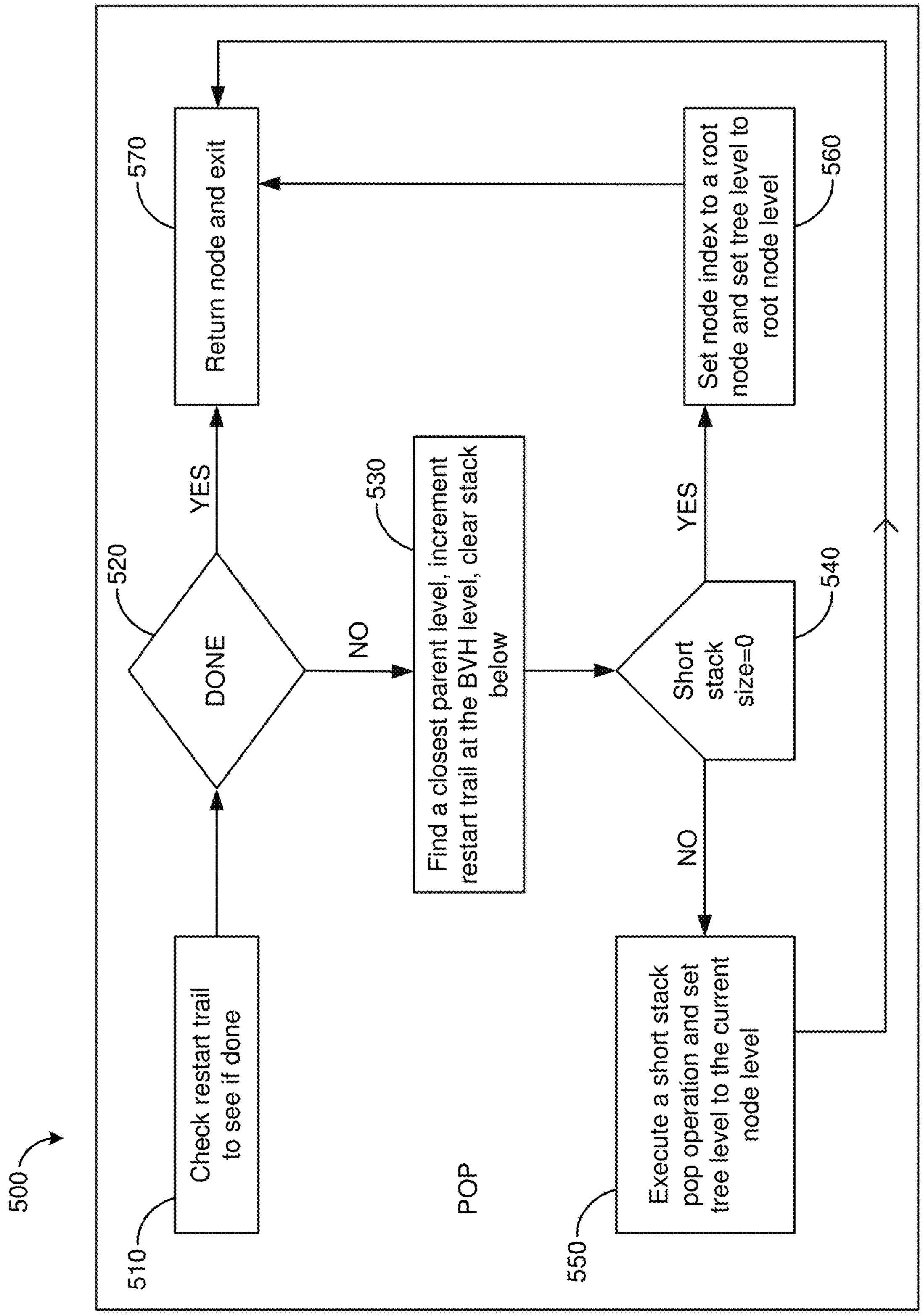
FIG. 5 illustrates an example pop operator mechanism for short stack with restart trail.

FIG. 5 illustrates an example pop operator mechanism 500 for short stack with restart trail. In block 510, check a restart trail to see if tree traversal is complete and proceed to block 520 for a tree traversal completion check. If tree traversal is complete, proceed to block 570. If tree traversal is not complete, proceed to block 530. In one example, the restart trail is a compact representation of tree traversal progress through a BVH tree. In one example, the restart trail includes one entry per BVH level commencing at a root node and continuing onwards to a current node. In one example, the entry is a count of already visited child nodes of a particular node at the BVH level. In block 530, find a closest parent level, increment restart trail at the BVH level and clear stack below. In one example, the closest parent level is the nearest ancestor node which has any child nodes which have not been traversed. In one example, the restart trail is preemptively updated to indicate that the node has been visited. In one example, the restart trail is next set to zero for a subtree of the node (i.e., to ensure traversal of the child nodes). Next, proceed to block 540.

In block 540, perform a short stack size check. If the short stack size is not equal to zero (i.e., a node may be popped from the short stack), proceed to block 550. If short stack size is equal to zero (i.e., there is no node to be popped from the short stack), proceed to block 560. In block 550, execute a short stack pop operation (i.e., with the node returned from the TTU) and set tree level (or restart level) to the current node level. In one example, if the current node level is marked as a last node for the tree level, update restart trail for the parent node to indicate that all nodes have been visited and subtree traversal is not required. Next, proceed to block 570. In block 560, set node index to a root node and set tree level to root node level (e.g. zero). Next, proceed to block 570. In block 570, return to node and exit.

Figure 6:
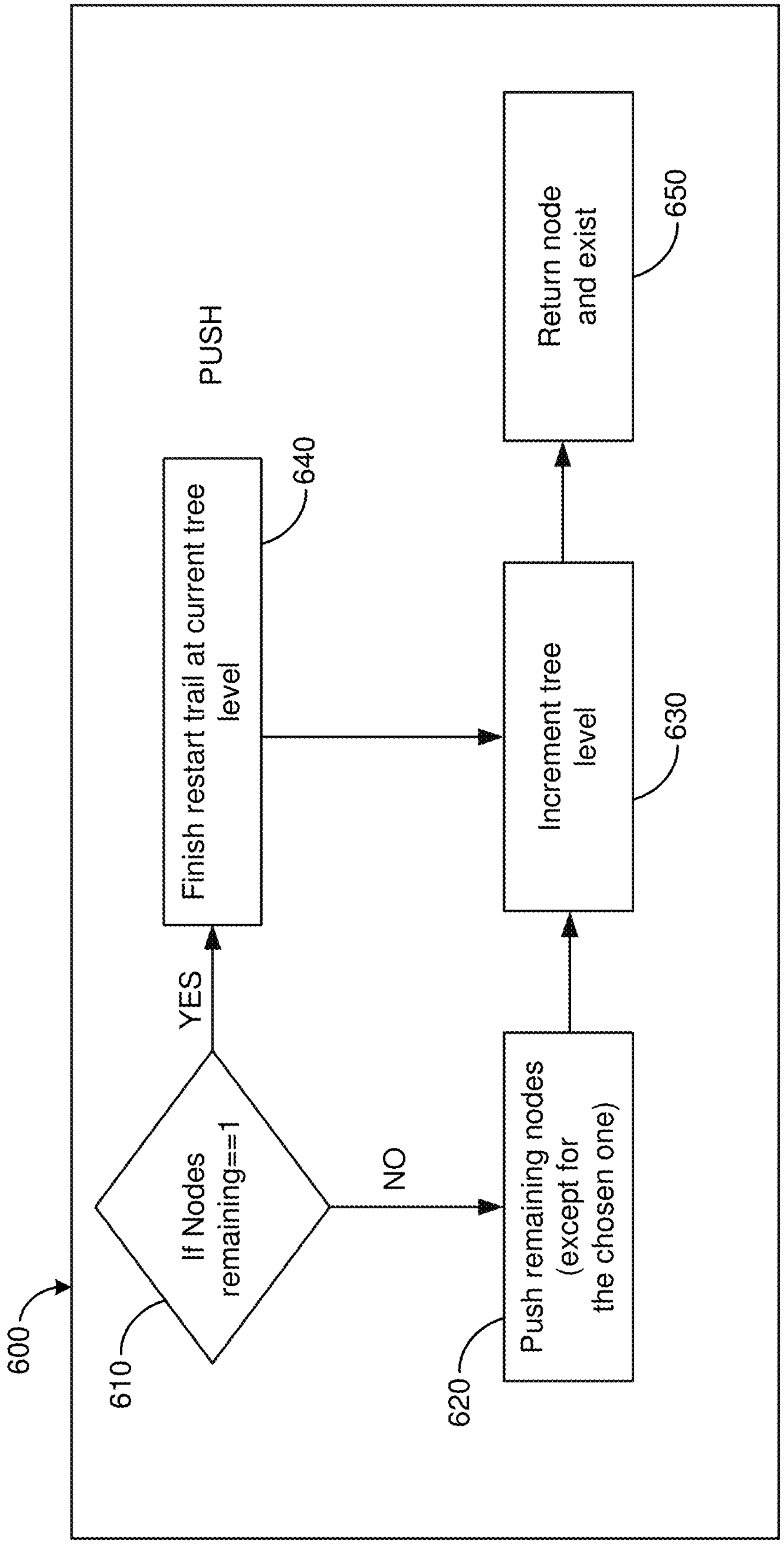
FIG. 6 illustrates an example push operator mechanism for short stack with restart trail.

FIG. 6 illustrates an example push operator mechanism 600 for short stack with restart trail. In block 610, determine if nodes remaining is equal to one. If no, proceed to block 620. If yes, proceed to block 640.

In block 620, execute a short stack push operation on remaining nodes, except for a chosen node. Next, in block 630, increment a tree (e.g., BVH) level. Next, in block 650, return node and exit.

In block 640, finish restart trail at current tree (e.g., BVH) level. Next, in block 630, increment tree level. Next, in block 650, return node and exit.

Figure 7:
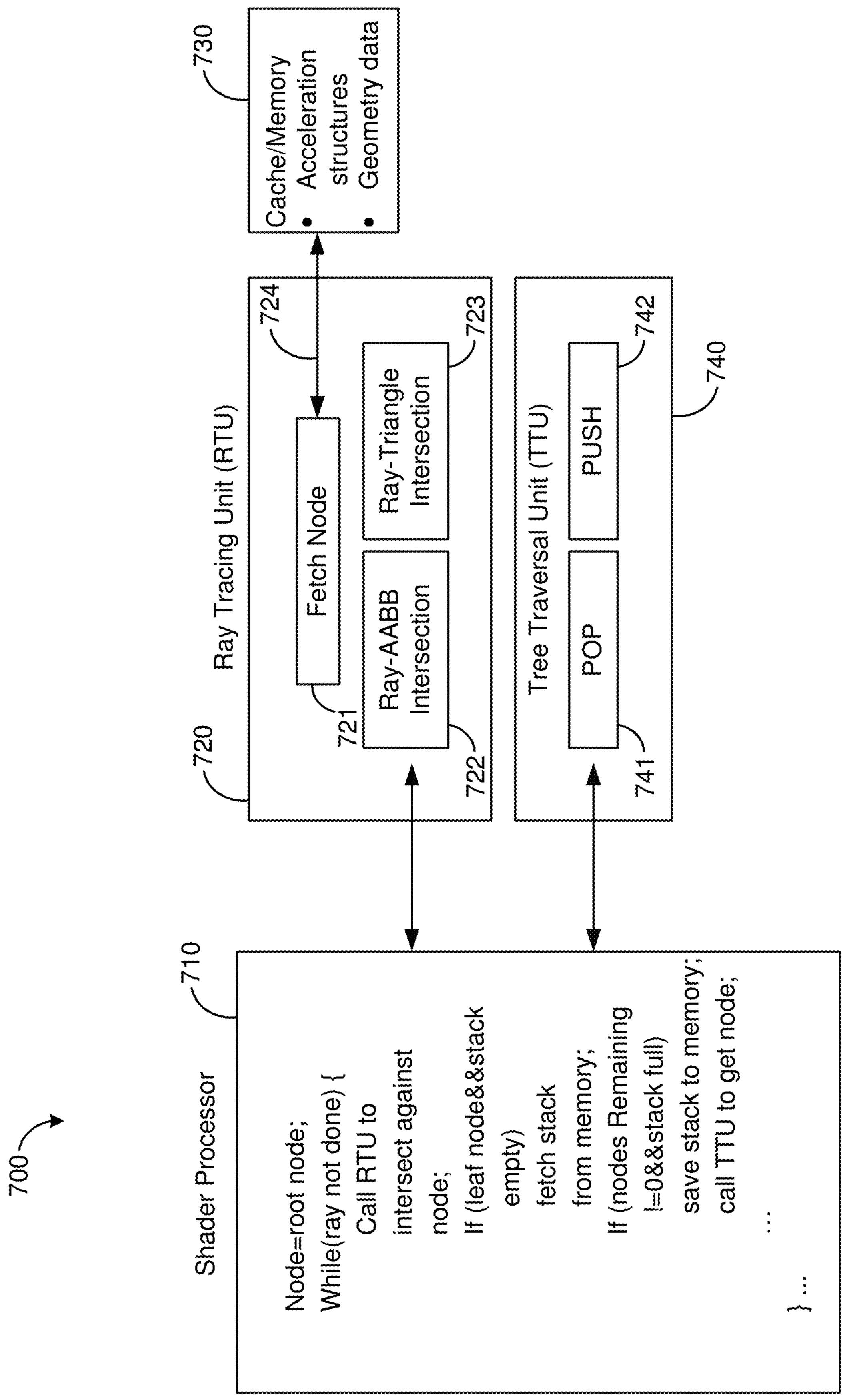
FIG. 7 illustrates an example tree traversal unit (TTU) architecture with full stack.

FIG. 7 illustrates an example tree traversal unit (TTU) architecture with full stack 700. In one example, the TTU architecture with full stack 700 includes a shader processor 710, a ray tracing unit (RTU) 720, a cache memory 730 and a tree traversal unit (TTU) 740. In one example, the shader processor 710 includes shader software which performs ray traversal processing. In one example, the ray traversal processing commences with a root node of a traversal tree and for subsequent nodes calls the RTU 720 to determine ray intersections against subsequent nodes and calls the TTU 740 to determine which node to visit next. In one example, the ray traversal processing is terminated when a leaf node is reached. In one example, the root node, subsequent nodes and leaf nodes are BVH nodes.

In one example, the shader processor 710 sends a first input 711 to the RTU 720 with ray information and node information. In one example, the shader processor 710 receives a first output 712 from the RTU 720 with ray hit information. In one example, the shader processor 710 sends a second input 713 to the TTU 740 with stack information and ray hit information. In one example, the shader processor 710 receives a second output 714 from the TTU 740 with stack information and node information.

In one example, the shader software in the shader processor 710 includes a first conditional test and a second conditional test. In one example, the first conditional test determines if the leaf node and the traversal stack are both empty before fetching the traversal stack from memory. In one example, the second conditional test determines if a quantity of remaining nodes is not equal to zero and if the traversal stack is full before saving the traversal stack to memory.

In one example, the RTU 720 includes a fetch node 721, a ray AABB intersection module 722 and a ray-triangle intersection module 723. In one example, the fetch node 721 is interconnected to the cache memory 730 over a memory databus 724 to access acceleration structure data and geometry data which are stored in the cache memory 730. In one example, the ray AABB intersection module 722 determines ray intersections with AABBs and the ray-triangle intersection module 723 determines ray intersections with triangles.

In one example, the TTU 740 includes a pop operator 741 and a push operator 742. For example, the pop operator 741 executes a pop operation on a traversal stack and the push operator 742 executes a push operation on the traversal stack.

Figure 8:
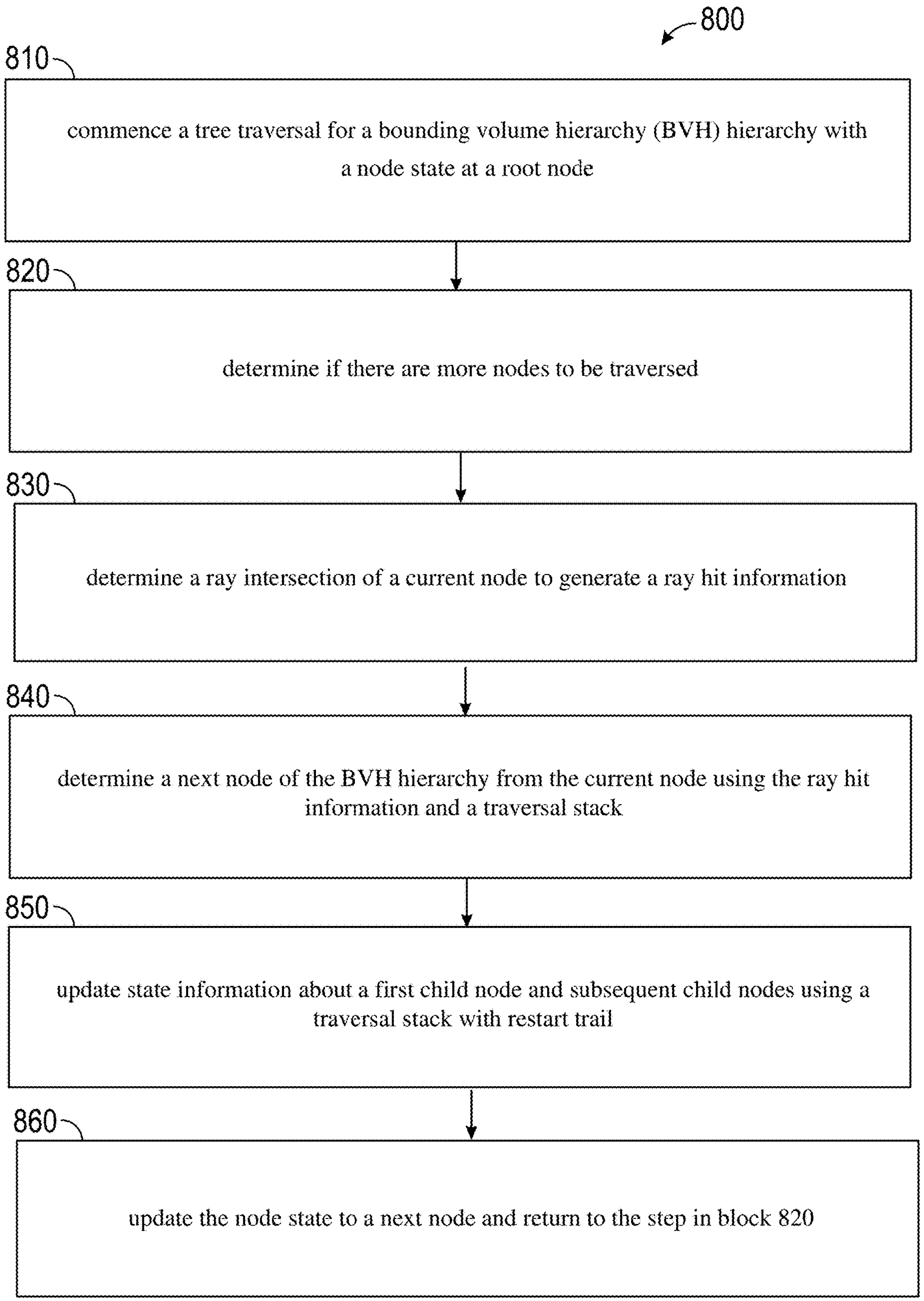
FIG. 8 illustrates an example flow diagram for ray tracing using traversal stack operations.

FIG. 8 illustrates an example flow diagram 800 for ray tracing using traversal stack operations. In block 810, commence a tree traversal for a bounding volume hierarchy (BVH) hierarchy with a node state at a root node. In one example, a tree traversal is commenced for a bounding volume hierarchy (BVH) hierarchy with a node state at a root node. In one example, the BVH hierarchy includes a plurality of levels. In one example, the BVH hierarchy groups 3D scene geometric shapes in a hierarchical tree of bounding volumes. In one example, the bounding volumes surround the 3D scene geometric shapes. In one example, the commencement is performed by a shader processor.

In block 820, determine if there are more nodes to be traversed. In one example, the node state at a current node of the BVH hierarchy is determined if it is a leaf node. In one example, the leaf node has no child nodes. If the current node is a leaf node, then terminate the tree traversal. If the current node is not a leaf node, then proceed to block 830. In one example, the node state determination is performed by the shader processor.

In block 830, determine a ray intersection of a current node to generate a ray hit information. In one example, a ray intersection of a current node is determined to generate a ray hit information. In one example, the ray intersection is a ray-axis aligned bounding box (AABB) intersection. In one example, the ray intersection is a ray-triangle intersection. In one example, the ray hit information is a list of geometric shapes which are intersected by the ray. In one example, the geometric shapes include AABBs, triangles, etc. In one example, the ray intersection determination is performed with knowledge of node content. In one example, the ray intersection determination is performed by a ray tracing unit (RTU).

In block 840, determine a next node of the BVH hierarchy from the current node using the ray hit information and a traversal stack. In one example, a next node of the BVH hierarchy from the current node is determined using the ray hit information and a traversal stack. In one example, the next node determination is based on identification of geometric shapes from the ray hit information which have been intersected by the ray. In one example, identification of geometric shapes orders child nodes of the current node in a visitation sequence. For example, identification may order child nodes into a first child node, a second child node, etc. In one example, the next node is the first child node. In one example, the next node determination is performed with knowledge of a tree structure in the BVH hierarchy. In one example, the next node determination and traversal ordering is performed by a tree traversal unit (TTU). In one example, identification of geometric shapes from the ray hit information is performed by the ray tracing unit (RTU).

In one example, ray traversal may be performed by a short stack backed by a full stack or by a short stack backed by a restart trail. In one example, usage of the short stack backed by the full stack requires the TTU to pop and push only from the short stack, without further information. In one example, the entire stack is maintained in main memory and if the short stack is either empty or full, information must be fetched from main memory.

In one example, usage of the short stack backed by the restart trail requires the TTU to maintain the restart trail. In one example, the restart trail contains information which allows reconstruction of the entire stack without maintenance of all stack entries. In one example, the restart trail requires minimal memory resources through exploitation of a very compact representation of traversal progress through the tree. That is, the restart trail maintains minimal information to reconstruction of the entire stack.

In one example, the TTU may be a stateless TTU or a stateful TTU. In one example, the stateless TTU accepts stack information as input and sends stack information as output without memory between iterations. That is, the stateless TTU relies on input data for push, pop and restart trail updating, and sends output data after operation completion.

In one example, the stateful TTU does not rely on input data to perform its operations, but instead stores state information internally for usage while it performs its operations.

In block 850, update a state information about a first child node and subsequent child nodes using a traversal stack with restart trail. In one example, a state information is updated about a first child node and subsequent child nodes using a traversal stack with restart trail.

In one example, the state information contains information about child nodes which are traversed by the ray but have not yet been visited. In one example, when the ray intersects more than one child node, an entry may be created which describes all intersected child nodes, except a first child node. In one example, the entry may be created using a push operation on the traversal stack. In one example, the first intersected child node and its descendants may be visited. In one example, if subsequent child nodes are intersected, another entry may be created using a pop operation on the traversal stack. Subsequently, ray traversal continues by executing a traversal stack pop operation and visiting a first node described in a first entry of the traversal stack top. In one example, the restart trail preserves state knowledge of which nodes at a particular level have been visited. For example, the restart trail may include a binary state for each level of the BVH hierarchy. In one example, the binary state may use a zero value to indicate an unvisited node and a one value to indicate a visited node. In one example, the state information update is performed with knowledge of a tree structure in the BVH hierarchy. In one example, the state information update is performed by the TTU.

In one example, the state information contains information about child nodes which are traversed by the ray but have not yet been visited. In one example, when the ray intersects more than one child node, an entry may be created which describes all intersected child nodes, except the first child node. In one example, the entry may be created using a push operation on the traversal stack. In one example, the first intersected child node and its descendants may be visited. In one example, if subsequent child nodes are intersected by the ray, another entry may be created using a pop operation on the traversal stack. Subsequently, ray traversal continues by executing a traversal stack pop operation and visiting a first node described in a first entry of the traversal stack top. In one example, the restart trail preserves state knowledge of which nodes at a particular level have been visited. For example, the restart trail may include a binary state for each level of the BVH hierarchy. In one example, the binary state may use a zero value to indicate an unvisited node and a one value to indicate a visited node. In one example, the state information update is performed with knowledge of a tree structure in the BVH hierarchy. In one example, the state information update is performed by the TTU.

In block 860, update the node state to a next node and return to the step in block 820. In one example, the node state is updated to a next node and return to the step in block 820.

In one aspect, one or more of the steps for providing three-dimensional (3D) computer graphics processing with ray tracing in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
- a tree traversal unit (TTU) coupled to a shader processor, the TTU configured to determine a next node to be intersected using a stack with a restart trail, wherein the restart trail maintains information to allow reconstruction of the entire stack; and
- a ray tracing unit (RTU) coupled to the shader processor, the RTU configured to determine a ray intersection against the next node.

2. The apparatus of claim 1, wherein the next node is a node in a bounding volume hierarchy (BVH).

3. The apparatus of claim 2, wherein the RTU is further configured to generate a ray hit information.

4. The apparatus of claim 3, further comprising the shader processor wherein the shader processor is configured to determine if a node state is a leaf node.

5. The apparatus of claim 4, wherein the TTU is further configured to use a push operation on a traversal stack to create a first entry.

6. The apparatus of claim 5, wherein the first entry is a plurality of intersected child nodes except a first child node.

7. The apparatus of claim 5, wherein the TTU is further configured to use a pop operation on the traversal stack to create a second entry.

8. The apparatus of claim 7, wherein the second entry is a plurality of intersected child nodes except a first child node.

9. A method comprising:
- determining a ray intersection of a current node to generate a ray hit information; and
- determining a next node of a bounding volume hierarchy (BVH) from the current node using the ray hit information and a traversal stack with a restart trail, wherein the restart trail maintains information to allow reconstruction of the entire traversal stack.

10. The method of claim 9, further comprising:
- determining if a node state is a leaf node, wherein the node state is at the current node; and
- updating a state information about a first child node and subsequent child nodes using the traversal stack.

11. The method of claim 10, wherein the restart trail preserves state knowledge of which of the first child node, or the subsequent child nodes have been visited by a ray.

12. The method of claim 10, further comprising updating the node state to the next node.

13. The method of claim 12, further comprising repeating the steps of claim 10 with a non-leaf node.

14. The method of claim 12, further comprising commencing a tree traversal with the node state at a root node.

15. The method of claim 9, wherein the ray intersection is a ray-axis aligned bounding box (AABB) intersection.

16. The method of claim 10, wherein the ray hit information is a list of geometric shapes intersected by a ray.

17. The method of claim 16, further comprising identifying the list of geometric shapes by ordering a plurality of child nodes of a current mode in a visitation sequence.

18. The method of claim 17, further comprising determining the next node based on an identification of geometric shapes from the ray hit information intersected by the ray.

19. The method of claim 17, further comprising determining the next node based on a tree structure.

20. The method of claim 17, further comprising creating a first entry to describe all of the plurality of child nodes that are intersected by the ray.

21. The method of claim 20, further comprising creating the first entry using a push operation on the traversal stack.

22. The method of claim 21, further comprising creating a second entry using a pop operation on the traversal stack.

23. The method of claim 22, wherein the subsequent nodes are intersected by the ray.

24. An apparatus for ray tracing, the apparatus comprising:
- means for determining if a node state is a leaf node, wherein the node state is at a current node;
- means for determining a ray intersection of the current node to generate a ray hit information; and
- means for determining a next node from the current node using the ray hit information and a traversal stack with a restart trail, wherein the restart trail maintains information to allow reconstruction of the entire stack.

25. The apparatus of claim 24, further comprising means for updating a state information about a first child node and subsequent child nodes using the traversal stack.

26. The apparatus of claim 25, wherein the traversal stack includes a restart trail which preserves state knowledge of which of a plurality of child nodes have been visited by a ray.

27. A non-transitory computer-readable medium storing computer executable code, operable on a device comprising at least one processor and at least one memory coupled to the at least one processor, wherein the at least one processor is configured to implement ray tracing, the computer executable code comprising:
- instructions for causing a computer to determine if a node state is a leaf node, wherein the node state is at a current node;
- instructions for causing the computer to determine a ray intersection of the current node to generate a ray hit information;

instructions for causing the computer to determine a next node from the current node using the ray hit information and a traversal stack; and instructions for causing the computer to update a state information about a first child node and subsequent child nodes using the traversal stack with a restart trail, wherein the restart trail maintains information to allow reconstruction of the entire stack.

28. The non-transitory computer-readable medium of claim 27, wherein the traversal stack includes a restart trail which preserves state knowledge of which of a plurality of child nodes have been visited by a ray.

* * * * *